United States Patent [19]
Tomioka et al.

[11] Patent Number: 5,428,880
[45] Date of Patent: Jul. 4, 1995

[54] PROCESS FOR MANUFACTURING VEHICLE BODY FOR AUTOMOBILES

[75] Inventors: Yoshio Tomioka, Wako; Kengo Takano, Itsukaichi; Yoichi Sakai, Niiza; Kazumi Sakamoto, Sayama, all of Japan

[73] Assignee: Honda Giken Kabushiki Kaisha, Tokyo, Japan

[21] Appl. No.: 248,860

[22] Filed: May 24, 1994

Related U.S. Application Data

[63] Continuation of Ser. No. 908,862, Jul. 1, 1992, abandoned, which is a continuation of Ser. No. 704,693, May 17, 1991, abandoned, which is a continuation of Ser. No. 496,141, Mar. 19, 1990, abandoned, which is a continuation of Ser. No. 217,794, Jul. 12, 1988, abandoned.

[30] Foreign Application Priority Data

May 16, 1988 [JP] Japan .................. 63-118969
May 20, 1988 [JP] Japan .................. 63-123371

[51] Int. Cl.⁶ .................................. B23P 25/00
[52] U.S. Cl. ........................... 29/458; 427/424
[58] Field of Search ............. 29/430, 458, 527.2, 29/527.4; 118/314, 324, 500; 198/465.1, 465.2, 465.3, 803.1, 803.2; 269/37, 42, 45, 58, 71; 427/424

[56] References Cited

U.S. PATENT DOCUMENTS

| | | | |
|---|---|---|---|
| 2,952,351 | 9/1960 | Stone | 118/500 X |
| 2,961,990 | 11/1960 | Wruck | 118/324 X |
| 3,673,658 | 7/1972 | Hagen | 29/430 X |
| 4,096,300 | 6/1978 | William et al. | 118/314 X |
| 4,590,654 | 5/1986 | Kajiura | 29/458 X |
| 4,609,093 | 9/1986 | Taketani et al. | 198/378 |
| 4,694,553 | 9/1987 | Tate, Jr. et al. | 29/458 X |
| 4,703,716 | 11/1987 | Hatfield | 118/500 |
| 4,714,044 | 12/1987 | Kikuchi et al. | 118/314 |
| 4,838,199 | 6/1989 | Weber | 118/500 |

FOREIGN PATENT DOCUMENTS

| | | |
|---|---|---|
| 62157873 | 3/1988 | Japan . |
| 63-107782 | 5/1988 | Japan . |

*Primary Examiner*—Joseph M. Gorski
*Attorney, Agent, or Firm*—Armstrong, Westerman, Hattori, McLeland & Naughton

[57] ABSTRACT

A process for manufacturing a vehicle body for automobiles in which at a welding step, a vehicle body and plate-like parts to be mounted onto the vehicle body, such as a bonnet, a trunk lid, fenders and doors, are separately fabricated, and at a painting step, they are separately passed through the same painting step, or separately passed through stages excluding a topcoating and a final drying, following which they are separately subjected to the same topcoating and final drying treatments. At an assembling step, the plate-like parts which have been subjected to fitting-out are assembled onto the vehicle body after completion of fitting-out or replenishment of grease and oils for the vehicle body.

16 Claims, 15 Drawing Sheets

PROCESS FOR MANUFACTURING VEHICLE BODY FOR AUTOMOBILES

This application is a continuation of U.S. application Ser. No. 07/908,862, filed on 7/1/92 and now abandoned, which is a continuation of U.S. application Ser. No. 07/704,693, filed on 5/17/91 and now abandoned, which in turn is a continuation of U.S. application Ser. No. 07/496,141, filed on 3/19/90 and now abandoned, which in turn is a continuation of U.S. application Ser. No. 07/217,794, filed on 7/12/88, and now abandoned.

BACKGROUND OF THE INVENTION

1. Field of the Invention

The present invention relates to a process for manufacturing a vehicle body for automobiles.

2. Description of the Prior Art

In general, the manufacture of a vehicle body for automobiles is carried out through four steps: a pressing step, a welding step, a painting step, and an assembling step, and it is a conventional practice to assemble together individual parts resulting from pressing of steel plates at the pressing step by welding or by use of an adhesive (in many cases, of a dry setting type) at the welding step to complete the build-up of a vehicle body (it is commonly referred to as a white body because it is uncoated). Then, the white body is subjected to a pretreatment, a priming (in general, an electrodeposition coating), a sealing, an intercoating and a topcoating at the painting step, and the vehicle body after completion of the painting is subjected to fitting-out operations for mounting of parts such as an engine, tires, a steering wheel and seats to provide a completed vehicle.

Recently, there has been proposed a process which involves removing doors from the vehicle body which has been coated to conduct the independent fitting-out for the vehicle body and the doors and thereafter effecting the reassembling in order to facilitate the assembling of parts to the interior of the vehicle body for the purpose of full automation of assembling by a robot (see Japanese Patent Application Laid-open No. 8884/78).

However, the above prior art is accompanied by the following various problems:

First, for an adhesive employed at the welding step, a thermal setting type adhesive is commonly used in view of adhesion, durability and term in which such adhesive can be used, to a pressing oil and a corrosion protecting oil deposited on the steel plates. A thermal setting reaction of such adhesive is effected by utilizing a drying oven at the painting step, but repeated heating and cooling as well as attachment of the part with another part occur at the painting step. In addition, the assembling itself is conducted prior to the setting reaction and hence, at the completion of the painting step, a difference in level and a gap between the parts are greater, and hence, a readjustment of assembling is required.

Secondly, treatments recently conducted at the painting step for the purpose of an elimination or reduction of labor and an increase in quality are a full-dipping pre-treatment and an electrodeposition coating, as well as sealing, intercoating and topcoating treatments by means of a robot. To sufficiently deal with a Gap and mating surfaces between the parts in effecting the full-dipping pretreatment and the electrodeposition, it is necessary to maintain the plate-like parts such as a bonnet, a trunk lid and doors in their opened conditions, attendant with a need for a personnel for mounting and removing a holding jig required thereby.

In conducting the sealing, intercoating and topcoating by means of the robot, the coating is not only on the surface of/he vehicle body, but also covers extensive areas such as the back side of the bonnet, the interior of the engine, the back sides of the doors, the interior of a compartment, and the back side of a trunk, and further mating surfaces and a gap between parts and hence, the sealing and coating operations with the opening and closing of the plate-like parts are difficult to a moving function of the robot. Moreover, the coating on the back sides of the parts requires an impossible position for the robot and consequently, there is possibly created a portion which is concealed behind the part itself and is not subjected to a satisfactory coating, resulting in a requirement for a correcting operation.

Yet further, if the robot is allowed to provide the opening and closing of the plate-like parts, the substantial coating time is limited and therefore, an exclusive opening and closing device (Japanese Patent Application Laid-open No. 143876/85) is required. However, if the exclusive opening and closing device is placed into a relatively narrow painting booth, there is a fear of external damages to the vehicle after it has been coated.

In addition, a metallic coating is very often used recently. Such a coating film is formed by application of a base coating containing an aluminum powder and a transparent clear coating in a so-called wet-on-wet manner, and a white body, with the doors and the like as vertical surfaces, is coated while being subjected to an influence of gravity. For this reason, for the base coating, there is produced a difference in line up of the aluminum powder between the vertical and horizontal surfaces, leading to a delicate difference in appearance of the color. In consideration of a flowing property during drying, a coating design is provided allowing for a limit of sagging of the clear coating on the vertical surface and hence it is difficult to achieve smoothness.

At the assembling step fitting-out steps are performed wherein, parts such as an engine, tires, a steering wheel, seats and panes of glass are assembled to the vehicle body which has been coated, but the plate-like parts must be opened and closed for the assembling, which is inferior in working properties. In addition, the coated surfaces may be damaged during assembling, bringing about an increase in repairing manhours.

Further, with a process in which the doors are removed after coating and independently subjected to fitting-out, as disclosed in Japanese Patent Application Laid-open No. 8884/83, the mating surfaces of the door and the vehicle body are not sufficiently coated and hence, it is necessary to make a repair coating at re-mounting.

The present invention has been accomplished to overcome the problems associated with the prior art, and it is an object of the present invention to provide a process for manufacturing a vehicle body for automobiles, wherein the automation is facilitated and an improvement in quality is provided.

SUMMARY OF THE INVENTION

A first feature of the present invention comprises separately fabricating a vehicle body and plate-like parts to be mounted on the vehicle body, such as a bonnet, a trunk lid, fenders and doors at a welding step; separately or alternately passing them through an identical painting step; and then assembling the plate-like parts which have been subjected to fitting-out of parts thereto, onto the vehicle body after fitting-out or replenishment of grease and oils for the vehicle body at an assembling step.

With the first feature, since the vehicle body and the plate-like parts are separately treated at the painting step, the coating is easy to automate and yet, because the vehicle body and the plate-like parts are passed through the identical painting step, there is obtained the same appearance of color in all parts. In addition, since the plate-like parts are mounted onto the vehicle body after completion of fitting-out, damaging of their coated surfaces is prevented.

A second feature of the present invention comprises separately fabricating a vehicle body and plate-like parts to be mounted onto the vehicle body, such as a bonnet, a trunk lid, fenders and doors at a welding step; separately passing them through treatments excluding a topcoating and final drying of a painting step, and thereafter separately or alternately subjecting them to identical topcoating and final drying treatments; and assembling the plate-like parts which have been subjected to fitting-out of parts thereto, onto the vehicle body after completion of fitting-out or replenishment of grease and oils for the vehicle body at an assembling step.

With the second feature, the vehicle body and the plate-like parts are separately passed through stages of the painting step excluding the topcoating and final drying stages and therefore, it is possible to perform a pre-treatment, a priming, a sealing and an intercoating which are suitable for the shapes of the plate-like parts, while providing the same final appearance of color.

A third feature of the present invention comprises separately fabricating a vehicle body and plate-like parts to be mounted onto the vehicle body, such as a bonnet, a trunk lid, fenders and doors at a welding step; separately passing them through a painting step, and then assembling tile plate-like parts which have been subjected to fitting-out, onto the vehicle body after completion of fitting-out or replenishment of grease and oils for the vehicle body at an assembling step.

With the third feature, it is possible to provide coating treatments suitable for shapes of the plate-like parts, because the vehicle body and the plate-like parts are separately passed through the painting step.

The above and other objects, features and advantages of the invention will become apparent from reading of the following description of the preferred embodiments, taken in conjunction with the accompanying drawings.

BRIEF DESCRIPTION OF THE DRAWINGS

FIGS. 1 to 12 illustrate a first embodiment of the present invention, wherein

FIG. 1 is a process diagram;

FIG. 2 is a schematic plan view showing a topcoating booth and a drying oven;

FIG. 3 is a perspective view illustrating a construction of a transport system;

FIG. 4 is an enlarged sectional view taken along a line IV—IV in FIG. 3;

FIG. 5 is an enlarged view taken in a direction of an arrow V in FIG. 3;

FIG. 6 is a sectional view taken along a line VI—VI in FIG. 5;

FIG. 7 is a sectional view taken along a line VII—VII in FIG. 5;

FIG. 8 is a schematic plan view of a coater;

FIGS. 9 and 10 are plan views of the transport system as being operated within the topcoating booth;

FIG. 11 is a plan view of the transport system as being operated within the drying oven; and FIG. 12 is a graph illustrating the degree of influence on the sharpness and on the degree of roughness depending upon the positions within the drying oven;

FIGS. 14 to 17 illustrate a second embodiment of the present invention, wherein

FIG. 14 is a process diagram;

FIG. 15 is a longitudinal sectional view of a priming booth;

FIG. 16 is a sectional view taken along a line XVI—XVI in FIG. 15; and

FIG. 17 is a front view in longitudinal section of a washing booth; and

DESCRIPTION OF THE PREFERRED EMBODIMENTS

The present invention will now be described by way of embodiments with reference to the accompanying drawings.

Figure 1:
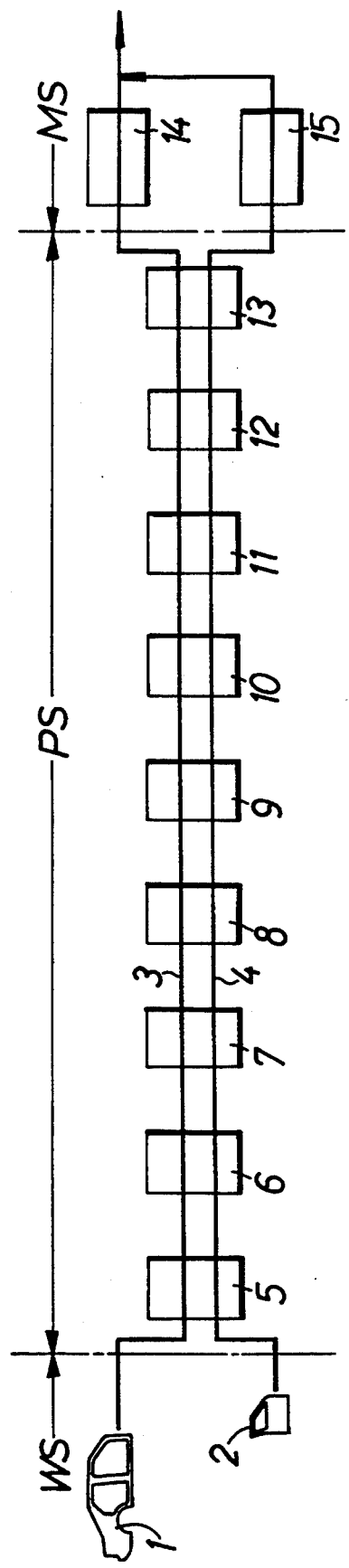

FIG. 1 illustrates a first embodiment of the present invention, wherein the manufacture of a vehicle body for an automobile is carried out, in sequence, through four steps: a pressing step (not shown), a welding step WS, a painting step PS, an assembling step MS. The vehicle body and plate-like parts 2 to be mounted on the body, such as a bonnet, a trunk lid, a fender and a door, which have been separately formed in the welding step WS, move along a main line 3 and a sub-line 4, respectively.

In the painting step PS, there are arranged, in sequence, a pretreating booth 5, a hydro-extraction drying oven 6, a priming booth 7, a washing booth 8, a drying oven 9, a sealer booth 10, a drying oven 11, a topcoating booth 12 and a drying oven 13.

In the assembling step MS, there are provided, in parallel, a first fitting-out section 14 in which the vehicle body 1 is subjected to a fitting-out operation, and a second fitting-out section in which the plate-like parts 2 are subjected to a fitting-out operation.

Figure 2:
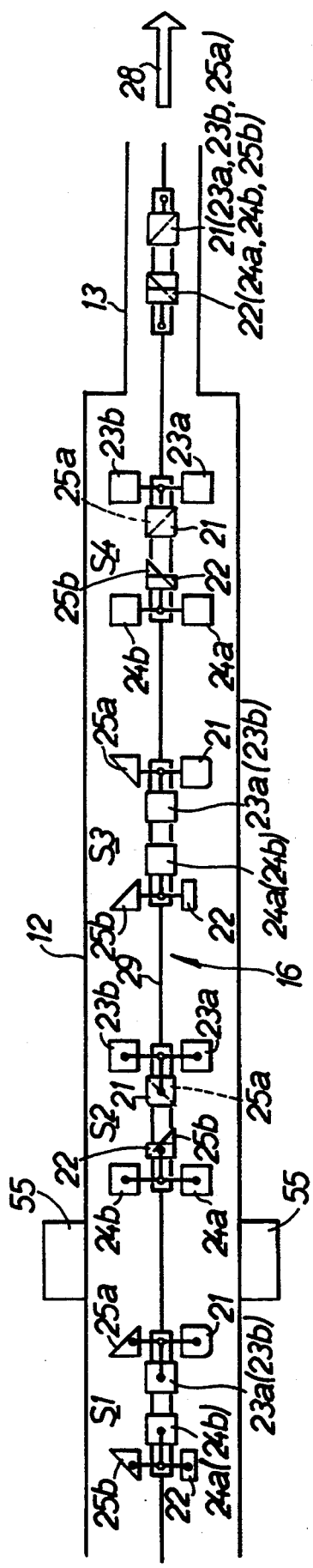

Referring to FIG. 2, disposed at a final stage of the painting step PS, i.e., in the topcoating booth 12 and the drying oven 13 are a transport system (not shown) for transporting the vehicle body 1 (see FIG. 1), and a transport system 16 for transporting the plate-like parts, e.g., a bonnet 21, a trunk lid 22, a pair of left and right front doors 23a and 23b, a pair of left and right rear doors 24a and 24b, and a pair of left and right fenders 25a and 25b, separately from the vehicle body 1.

Figure 3:
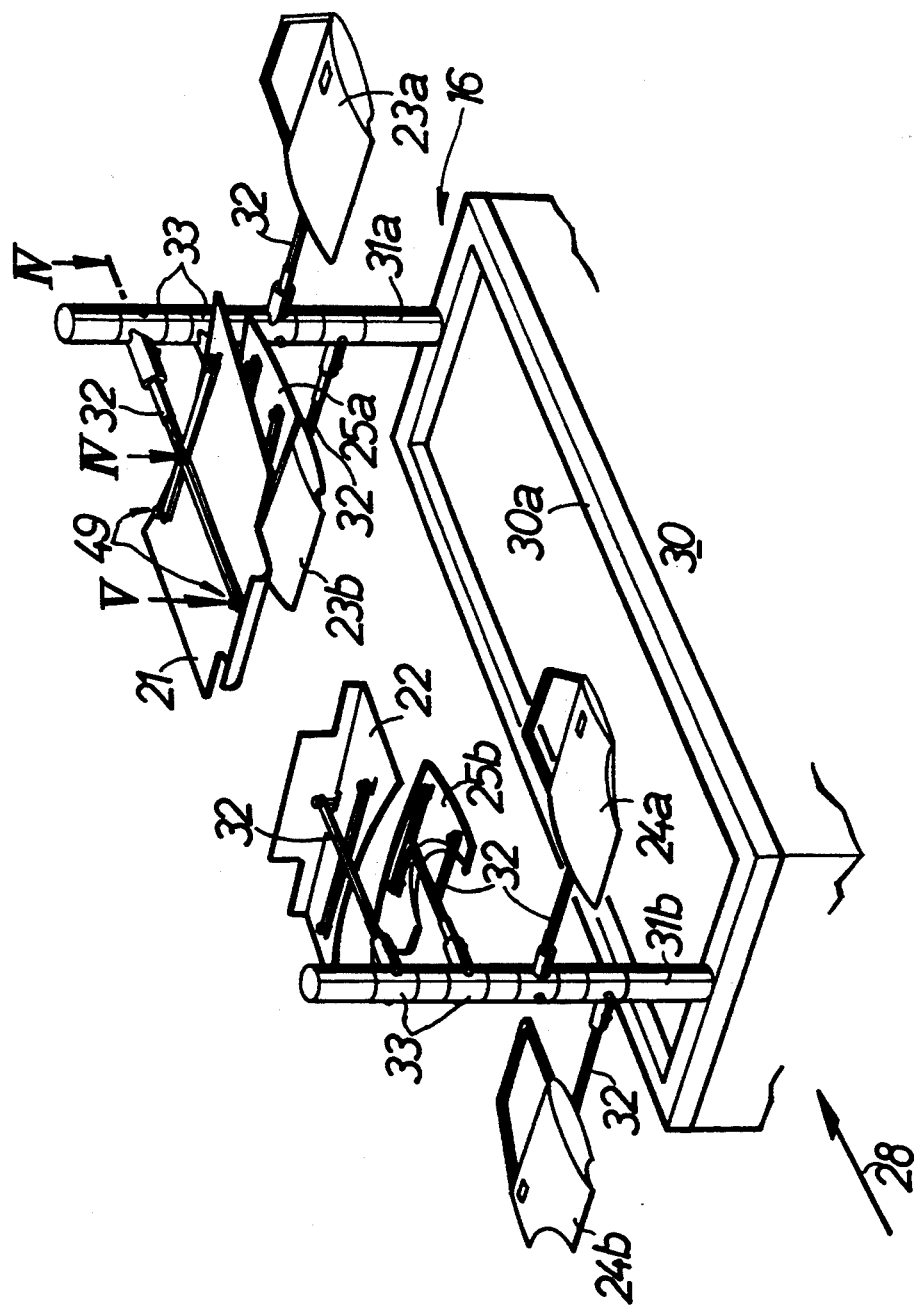

Referring to FIG. 3, the transport system 16 comprises a transport carriage 30 driven by a transport conveyer 29 (see FIG. 2) laid along a transporting direction 28 within the topcoating booth 12 and drying oven 13, a pair of posts 31a and 31b mounted to rise on a main frame 30a of the transport carriage 30, and support arms 32 carried at a plurality of, e.g., four, vertically spaced apart points of the posts 31a and 31b for pivotal movement about axes of the posts 31a and 31b and an axis intersecting these axes at right angles. Moreover, the posts 31a and 31b rise at the widthwise central portions of front and rear ends of the main frame 30 along the transporting direction 28, respectively, and the four support arms 32 are carried on each of the posts 31a and 31b.

Figure 4:
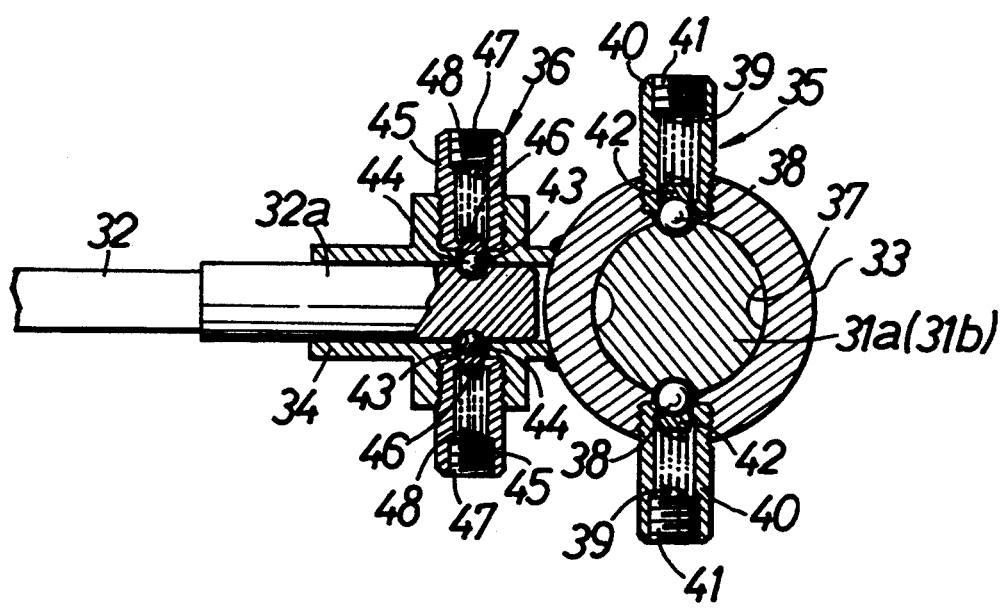

Referring also to FIG. 4, the support arm 32 extends in a direction intersecting the axis of the corresponding post 31a, 31b and has a base end 32 carried on the corresponding post 31a, 31b. First short cylindrical support cylinders 33 are fitted over each of the posts 31a and 31b at a plurality of, e.g., four axially spaced apart points for arrested axial movement but for pivotal movement about axes, and a second short cylindrical support tube 34 is secured to an outer surface of the support cylinder 33 along a radial direction of the latter. The base end 32a of each support arm 32 is fitted into the second support tube 34 for turning movement about the axis. This ensures that each support arm 32 is carried on the-corresponding post 31a, 31b for pivotal movement about the axis of such post 31a, 31b, i.e., a vertical axis and for turning movement about an axis intersecting the axis of each post 31a, 31b at right angles.

A detent mechanism 35 is mounted between the post 31a, 31b and the first support cylinder 33 for moderately permitting the pivotal movement of the first support cylinder 33 through 90 degrees, and a detent mechanism 36 is mounted between the second support tube 34 and the support arm 32 for moderately or regularly permitting the turning movement of the support arm 32 through 180 degrees.

The detent mechanism 35 comprises four fitting recesses 37 provided on an outer surface of each the post 31a, 31b corresponding to an inner surface of the first support cylinder 33, a pair of spheres 38 fittable in the fitting recesses 37 on one diametrical line in the post 31a, 31b, and springs 39 for biasing the spheres 38 in a direction to fit into the fitting recesses 37. The individual fitting recesses 37 are defined in a hemipherical configuration on the outer surface of the posts 31a and 31b at locations circumferentially spaced apart through 90 degrees. On the other hand, a pair of cylindrical housings 40 are secured to the first support cylinder 33 with their interiors leading to the inner surface of the support cylinder 33 to have an axis corresponding with one diametrical line intersecting the axis of the second support tube 34 at right angles. An outer end of the housing 40 is closed by a cap 41, and a spring 39 is provided in compression between the cap 41 and a receiving member 42 inserted in the housing 40 to bear the sphere 38 from its back.

In the detent mechanism 35, each sphere 38 fitted in the fitting recess 37 is repulsively retained, and by providing the turning movement of the first support cylinder 33 so that each sphere 38 runs onto the outer surface of the post 31a, 31b from the fitting recess 37, the first support cylinder 33 turns about the axis of the post 31a, 31b until the sphere 38 is fitted into the next fitting recess 37, i.e., through 90 degree.

The detent mechanism 36 comprises a pair of fitting recesses 43 provided on an outer surface of the base end 32a of the support arm 32 in correspondence to the inner surface of the second support tube 34, a pair of spheres 44 fittable into the fitting recesses 43 on one diametrical line of the base end 32a, a pair of short cylindrical housings 45 secured to the second support tube 34 with an axis corresponding with one diametrical line of that tube 34, a receiving member 46 inserted in the housing 45 to bear each sphere 44 from its back, and a spring 48 provided in compression between a cap 47 closing an outer end of the housing 45 and the receiving member 46.

In the detent mechanism 36, the sphere 44 fitted in the fitting recess 43 is resiliently retained, and by providing the pivotal movement of the support arm 33 so that the sphere 44 runs onto the outer surface of the base end 32a from the fitting recess 43, the support arm 32 turns until the sphere 44 is fitted into the next fitting recess 43, i.e., through 180 degree.

Therefore, the support arm 32 is capable of moderately pivoting about the post 31a, 31b through 90 degrees and moderately turning through 180 degrees about the axis intersecting the axis of the post 31a, 31b at right angles.

Figure 5:
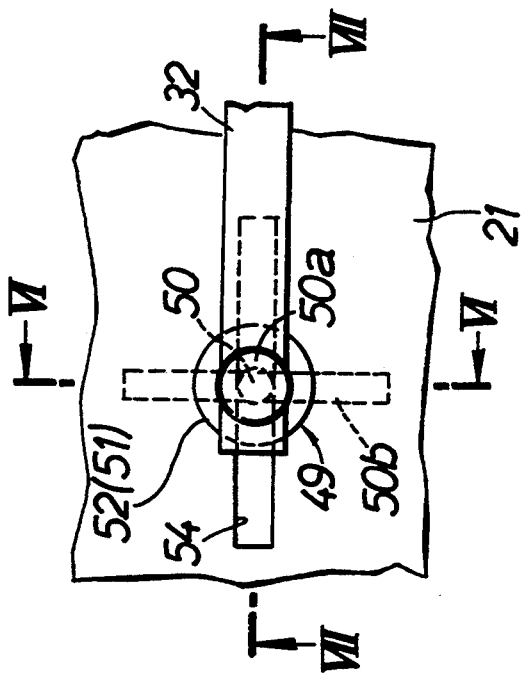
Figure 6:
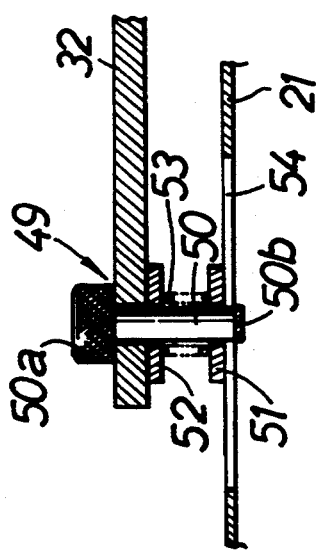
Figure 7:
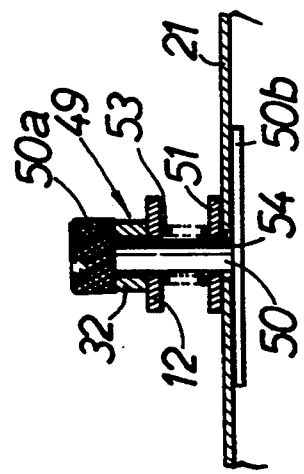

Referring to FIGS. 5, 6 and 7, each of the support arms 32 has mounting means provided thereon, e.g., at three places for detachably supporting one of the bonnet 21, the trunk lid 22, the pair of left and right front doors 23a and 23b, the pair of left and right rear doors 24a and 24b and the pair of left and right fenders 25a and 25b as the plate-like parts. The mounting means 49 comprises a pivotal shaft 50 pivotally carried on the support arm 32 and having an operating head 50a engaging the support arm 32 at one end and an engage portion 50b at the other end, a washer 51 clamping a plate-like part between the washer itself and the engage portion 50b, a washer 52 bearing against the support arm 32, and a spring 53 provided in compression between both the washers 51 and 52 to surround the pivotal shaft 50. The lock portion 50b is mounted on the other end of the pivotal shaft 50 to extend on the opposite sides along one diametrical line of the pivotal shaft 50. On the other hand, an engage hole 54 is provided in the plate-like part, for example, the bonnet 21, so that the lock portion 50b can be inserted into the engage hole 54. Moreover, the washer 51 is formed at a dimension larger than the width of the engage hole 54.

With such mounting means 49, if the lock portion 50b is inserted through the engage hole 54 while causing the washer 51 to bear, for example, against the bonnet 21 to compress the spring 53, and the pivotal shaft 50 is turned through 90 degree, following which the operator's hand is released, the bonnet 21 can be clamped between the washer 51 and the lock portion 50b by a spring force of the spring 53 and thus detachably carried. Moreover, the mounting means 49 is arranged to support the plate-like part in a substantially horizontal attitude even if the support arm 32 pivotally movable through 180 degree by the click mechanism 36 is in any pivotal position.

Referring again to FIG. 2, first, second, third and fourth coating or painting stages S1, S2, S3 and S4 are established within the topcoating booth 12 at four places spaced apart along the transporting direction 28, respectively, and a coating-control board 55 is disposed outside the topcoating booth 12 at a place between the first and second coating or painting stage S1 and S2.

Figure 8:
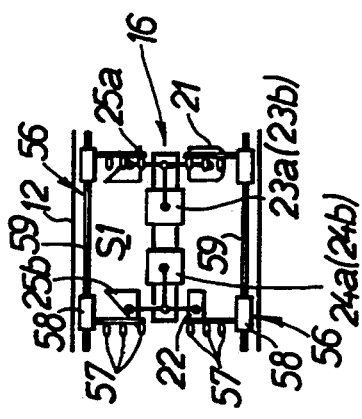

Referring to FIG. 8, a pair of coaters or paint sprayers 56 reciprocally movable in the transporting direction 28 on the opposite sides of the transport conveyer 29 are disposed at each of the stages S1 to S4. The coater 56 is constructed so that a moving part 58 having a plurality of coating guns 57 capable of spraying a coating from above toward the plate-like part being transported on the transport system 16 is reciprocally moved along a guide rail 59, whereby only the plate-like parts protruded on the opposite sides from the transport carriage 30 are coated by the coaters 56.

In addition, the drying oven 13 is formed at a width smaller than that of the topcoating booth 12, and an air plenum (not shown) for blowing off hot air upwards is disposed at a lower portion within the drying oven 13.

The operation of the first embodiment will be described below. Parts resulting from pressing of a steel plate at the pressing step are assembled together by welding or by bonding with a thermosetting adhesive at the welding step WS to form a vehicle body 1 and a plate-like part 2. In this case, the plate-like part 2 and the plate-like part-mounted portion of the vehicle body 1 are checked by a master part to ensure that the plate-like part 2 and the vehicle body 1 can be finally assembled with precision.

Then, at the painting step PS, the vehicle body 1 and the plate-like part 2 are separately or alternately passed through the pretreating booth 5, the water-extraction drying oven 6, the priming booth 7, the washing booth 8, the drying oven 9, the sealer booth 10, the drying oven 11, the topcoating booth 12 and the drying booth 13, for painting or coating treatment.

Figure 9:
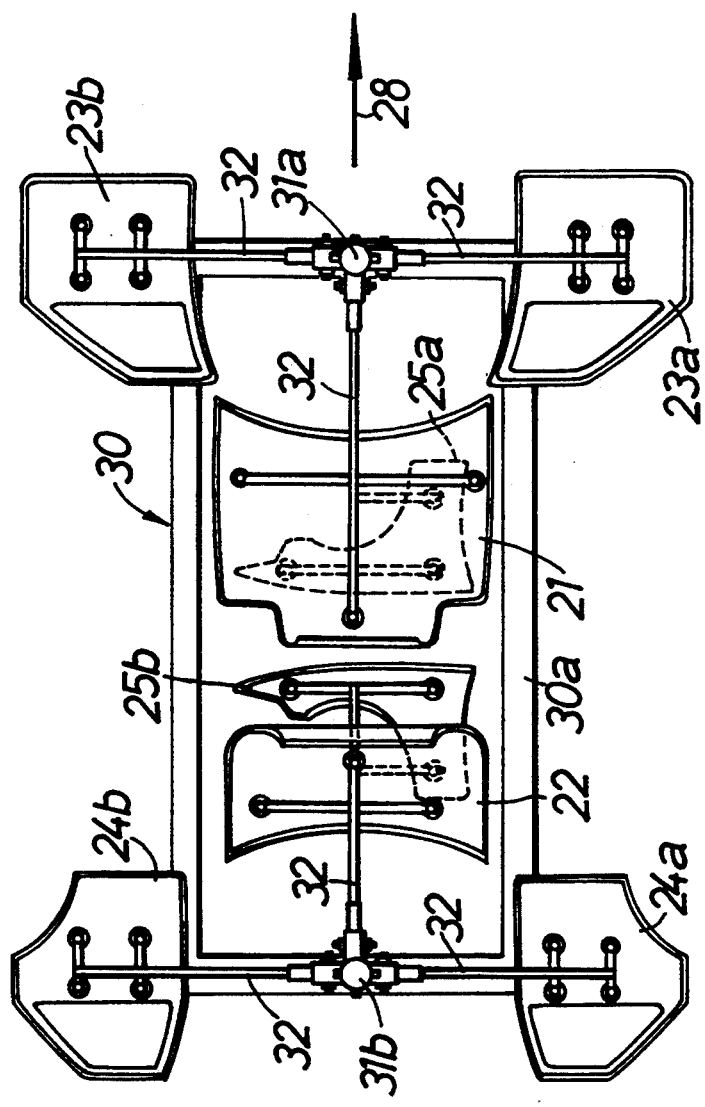

In coating the plate-like parts 2 in the topcoating booth 12 and the drying oven 13 at the final stage of the above painting step PS, the bonnet 21, the front doors 23a and 23b and the fender 25a are releasably supported on the four support arms 32 mounted on the post 31a on the front end of the transport carriage 30, while the trunk lid 22, the rear doors 24a and 24b and the fender 25b are releasably supported on the four support arms 32 mounted on the post 31b on the rear end of the carriage 30. When the transport carriage 30 with the individual plate-like parts 21, 22, 23a, 23b, 24a, 24b, 25a and 25b carried thereon has reached the first painting stage S1, the support arms 32 are driven to turn, for example, by manual operation, so that the bonnet 21 and the fender 25a may assume positions to protrude on the opposite sides of the transport carriage 30 in an offset relation through 180 degree in a horizontal plane, and the trunk lid 22 and fender 25b may also assume positions to protrude on the opposite sides of the transport carriage 30 in an offset relation through 180 degree in a horizontal plane, and so that the front doors 23a, 23b and the rear doors 24a, 24b may overlie one on the other at a widthwise central portion of the transport carriage 30, as shown in FIG. 9, in order to coat, for example, the backs of the bonnet 21, the trunk lid 22 and the fenders 25a and 25b.

By reciprocally driving the coaters 56 along the transporting direction 28 in this state, the backs of the bonnet 21, the trunk lid 22 and the fenders 25a and 25b are coated.

Then, at the second painting stage S2, in order to coat the backs of the front doors 23a, 23b and the rear doors 24a, 24b, the support arms 32 are driven to turn, so that the both front doors 23a and 23b may assume positions to protrude on the opposite sides of the transport carriage 30 in an offset relation through 180 degree in a horizontal plane, and the both rear doors 24a and 24b may assume positions to protrude-on the opposite sides of the transport carriage 30 in an offset relation through 180 degree in a horizontal plane, and so that the bonnet 21 and the fender 25a as well as the trunk lid 22 and the fender 25b may overlie one on the other at a widthwise central portion of the transport carriage 30, respectively.

By reciprocally driving the coaters 56 along the transporting direction 28 in this state, the backs of the front doors 23a, 23b and the rear doors 24a, 24b are coated.

Figure 10:
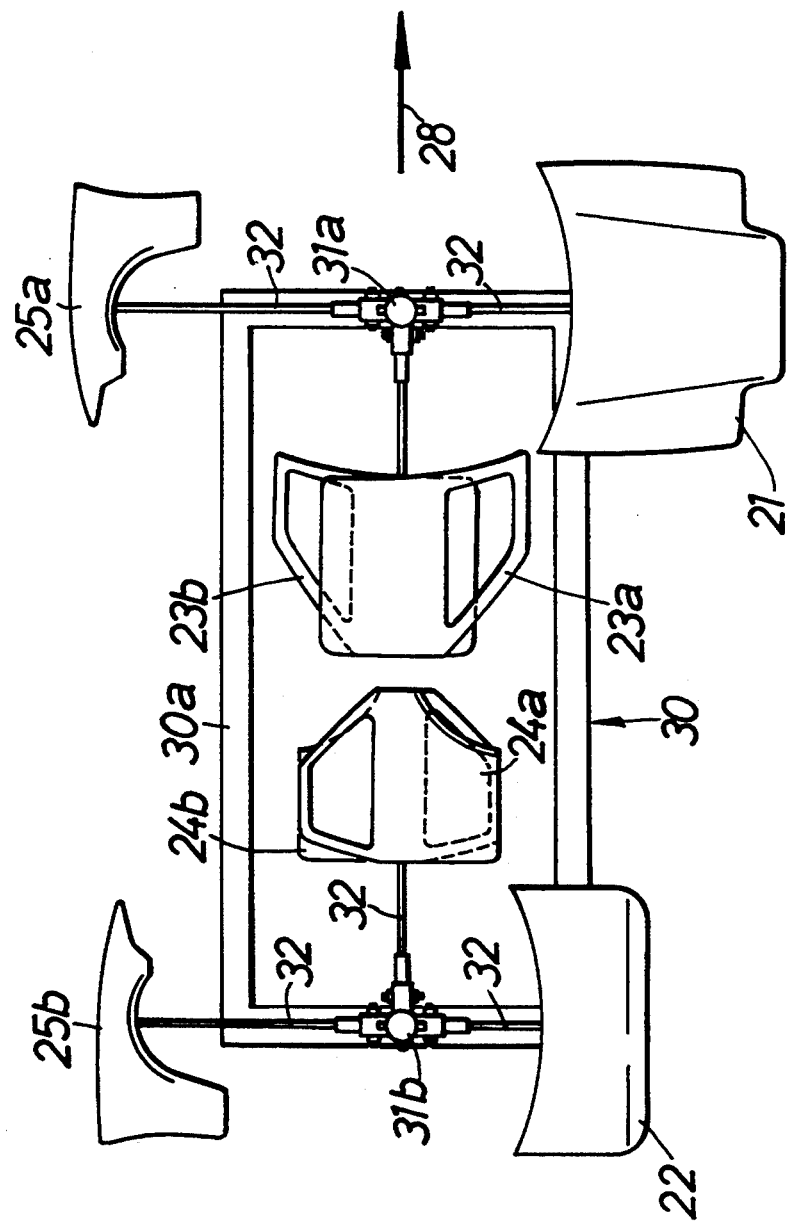

At the third painting stage S3, in order to coat the surfaces of the bonnet 21, trunk lid 22 and the fenders 25a and 25b, the support arms 32 are driven to turn, so that the bonnet 21 and the fender 25a may assume positions to protrude on the opposite sides of the transport carriage 30 in an offset relation through 180 degree in a horizontal plane, and the trunk lid 22 and the fender 25b may assume positions to protrude on the opposite sides of the transport carriage 30 in an offset relation through 180 degree in a horizontal plane, and so that the front doors 23a, 23b and the rear doors 24a, 24b overlie one on the other at a widthwise central portion of the transport carriage 30, as shown in FIG. 10. Moreover, the individual arms 32 are driven to turn through 180 degree about the axis perpendicular to the axes of the posts 31a and 31b, so that the surfaces of the front doors 23a and 23b, the rear doors 24a and 24b, and the fenders 25a and 25b may point upward.

Reciprocal driving of the coaters 56 in the transporting direction 28 in this state causes the surfaces of the bonnet 21, the trunk lid 22 and the fenders 25a and 25b to be coated.

Further, at the fourth painting stage S4, in order to coat the surfaces of the front doors 23a, 23b and the rear doors 24a, 24b, the support arms 32 are driven to turn, so that the both front doors 23a and 23b may assume positions to protrude on the opposite sides of the transport carriage 30 in an offset relation through 180 degree in a horizontal plane, and both rear doors 24a and 24b may assume positions to protrude on the opposite sides of the transport carriage 30 in an offset relation through 180 degree in a horizontal plane, and so that the bonnet 21 and the fender 25a as well as the trunk lid 22 and the fender 25b overlie one on the other at a widthwise central portion of the transport carriage 30, respectively.

Reciprocal driving of the coaters 56 in the transporting direction 28 in this state causes the surfaces of the front doors 23a, 23b and the rear doors 24a, 24b to be coated.

In this manner, the double top-coating is carried out for the surfaces and backs of the bonnet 21, the trunk lid 22, the front doors 23a and 23b, the rear doors 24a and 24b and the fenders 25a and 25b. During coating at each of the stages S1 to S4, the surfaces to be coated are substantially horizontal and hence, a complicated operation of the coater 56 need not be performed, and only a simple construction of the coater is required. Moreover, it is possible to conduct the coating in a substantially horizontal position of the to-be-coated surface turned upwards and hence, the thickness of the coating can be increased with increasing of coating-sagging limit, and further, the coating of the peripheral edge of each plate-like part is facilitated, and the corrosion-protecting performance can be improved.

Figure 11:
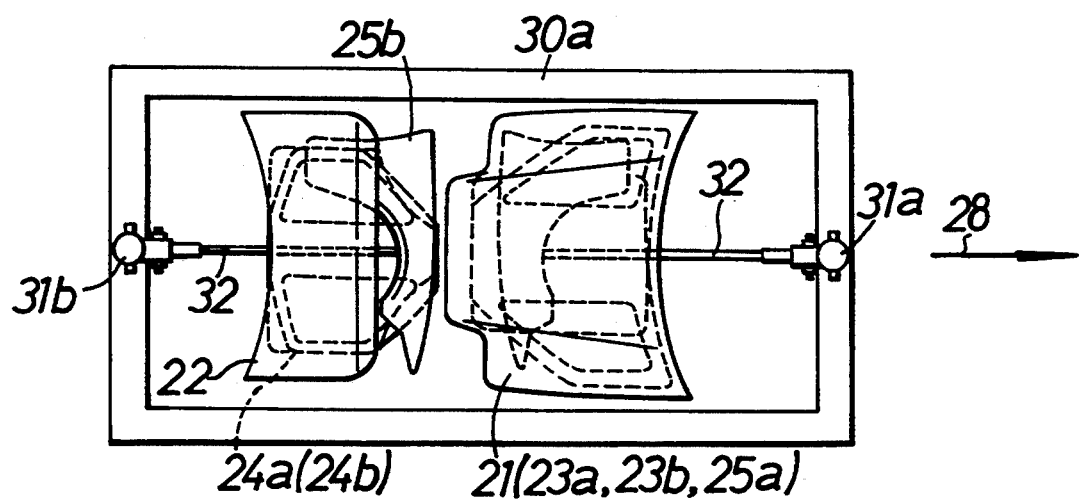

After completion of such a coating within the topcoating booth 12, the transport carriage 30 enters the drying oven 13, wherein the individual plate-like parts are arranged to overlie one on another. More specifically, as shown in FIG. 11, on the side of the post 31a, the bonnet 21, the front doors 23a and 23b, and the fender 25a overlie one on another at the widthwise central portion of the transport carriage 30, while on the side of the post 31b, the trunk lid 22, the rear doors 24a and 24b and the fender 25b likewise overlie one on another. This enables the amount of transport carriage 30 protruding oppositely sideways to be reduced, thereby making it possible to correspondingly reduce the width of the drying over 13. Moreover, when entering the drying oven 13, the individual plate-like part has its face, i.e., outer surface remaining pointing upward and pointing to the opposite side from the hot-air plenum, and therefore, it is possible to avoid blowing of the hot air directly against the outer surface and to prevent deposition of dust entrained in the hot air onto the outer surface.

Figure 12:
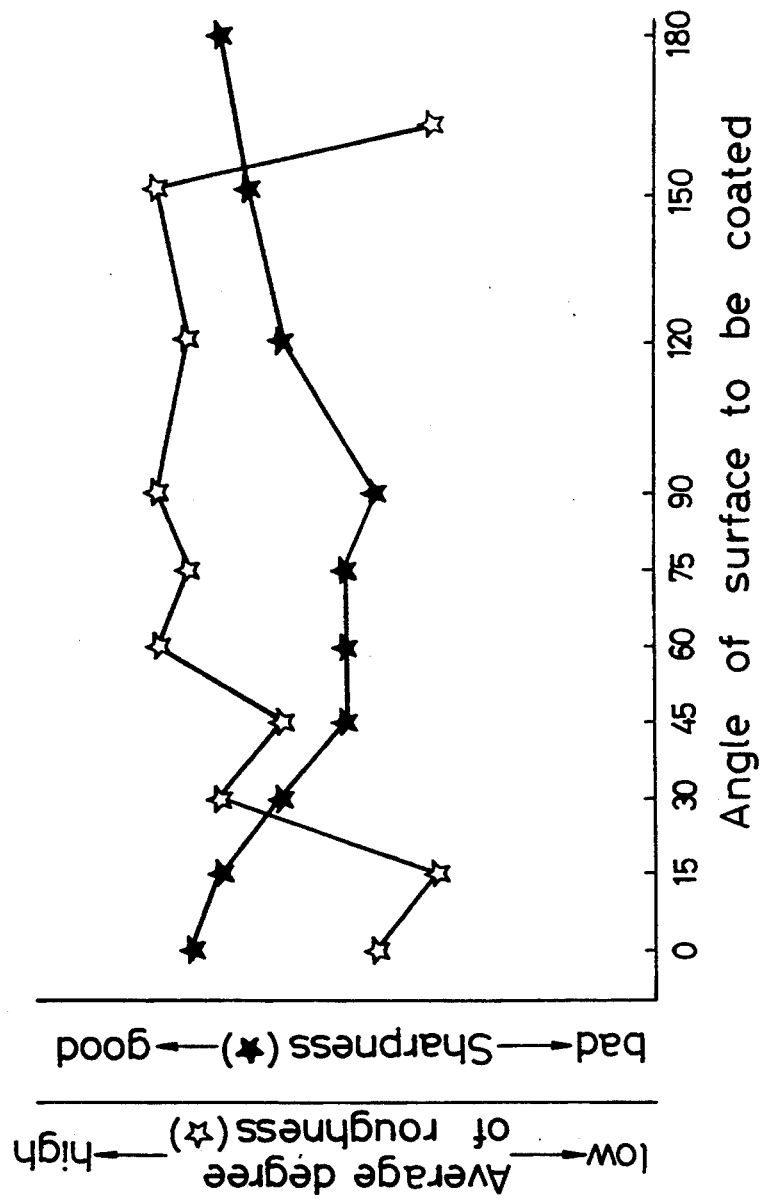

Here, it is to be noted that an influence may be exerted on the sharpness and the degree of roughness of the coating after drying depending upon the positions of the individual plate-like parts, i.e., the bonnet 21, the trunk lid 22, the front doors 23a and 23b, the rear doors 24a and 24b and the fenders 25a and 25b within the drying oven 13. The degree of such influence is illustrated in FIG. 12, wherein the sharpness is indicated by ✱ and the degree of roughness is by ✵ with the angle of the to-be-coated surface as the axis of abscissas, the angle being determined to be zero degree when the to-be-coated surface is in a horizontal position. As apparent from FIG. 12, excellent sharpness and degree of roughness can be obtained by drying while maintaining a substantially horizontal position in a range of from a completely horizontal state to $+30$ degree.

The vehicle body 1 after coating treatment is passed to the first fitting-out section 14 for the subsequent assembling step MS, where the fitting-out is conducted. On the other hand, the fitting-out is carried out for the plate-like parts 2 after coating treatment in the second fitting-out section 15. Then, the plate-like parts 2 after completion of the fitting-out are mounted onto the vehicle body 1 after completion of the fitting-out or after completion of replenishment of grease and oils, thus completing the manufacture of the vehicle body.

With such a manufacturing process illustrated in FIG. 1, the following effects can be exhibited: (a) By assembling the plate-like parts 2 to the vehicle body 1 at the assembling step MS, the assembling controls which have been conventionally required two times at the welding step WS and the assembling step MS can be replaced by only one control at the assembling step MS; (b) Since the curing reaction of the thermosetting type adhesive employed at the welding step WS can be effected at the coating step PS alone, a strain due to the mutual attachment of the parts is not produced, leading to a faciliation of the assembling control; (c) In conducting the immersing treatment at the painting step PS, any jig is unnecessary for opening the plate-like parts 2 from the vehicle body 1 and hence, the operation for mounting and removing such jig is not required; (d) Any interference of the parts with each other at the painting step PS can be avoided to improve the processing and overall depositing properties; (e) During sealing, the best coating attitude can be assumed and moreover, a spray-type sealing agent can be employed; (f) During coating of the vehicle body 1, a masking treatment is not required; (g) If a robot is used for intercoating and topcoating, then opening and closing of the plate-like parts 2 are not required and the range of motion of the robot is increased and further, there is no possibility of interference; (h) Since the best coating attitude can be assumed, coating of the plate-like parts 2 can be automated by a simple device such as a reciprocator; (i) Since the plate-like parts 2 can be coated in their horizontal positions, any plate-like part 2 can be uniformly coated so as not to produce a delicate difference in color; (j) Holding the plate-like parts 2 to be in a horizontal position ensures that the coating is out of danger of sagging even with a somewhat thick coating; (k) Since the plate-like parts 2 are coated in their horizontal positions, good sharpness can be obtained; (l) The fitting-out for the vehicle body 1 is facilitated at the assembling step MS; (m) The plate-like parts 2 are prevented from being damaged during fitting-out for the vehicle body 1; (n) The fitting-out for the plate-like part 2 is also conducted independently and hence, is facilitated; and (o) The automation of the fitting-out for the vehicle body 1 and the plate-like part 2 is faciliated.

Figure 13:
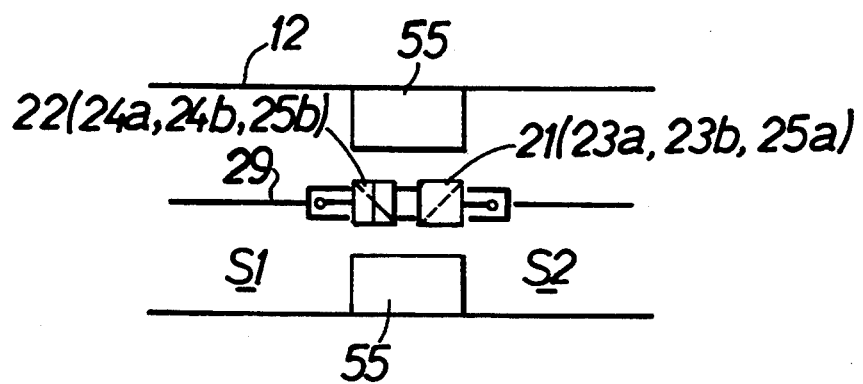
FIG. 13 is a schematic plan view of details of a modification to the above first embodiment.

FIG. 13 illustrates a modification to the above first embodiment, wherein parts corresponding to those in the above embodiment are indicated by the same reference characters.

As in the drying oven 13 in the above-described embodiment, the individual plate-like parts, i.e., the bonnet 21, the trunk lid 22, the front doors 23a and 23b, the rear doors 24a and 24b and the fenders 25a and 25b can be also arranged to overlie one on another in the topcoating booth 12, when they are passed between the individual painting stages S1 to S4. If doing so, the coating-control board 55 which has been disposed outside the topcoating booth 12 in the previous embodiment can be disposed between the coating stages, for example, between the stages S2 and S2 within the topcoating booth 12, and this make it possible to clean-out the surroundings of the topcoating booth 12.

Figure 14:
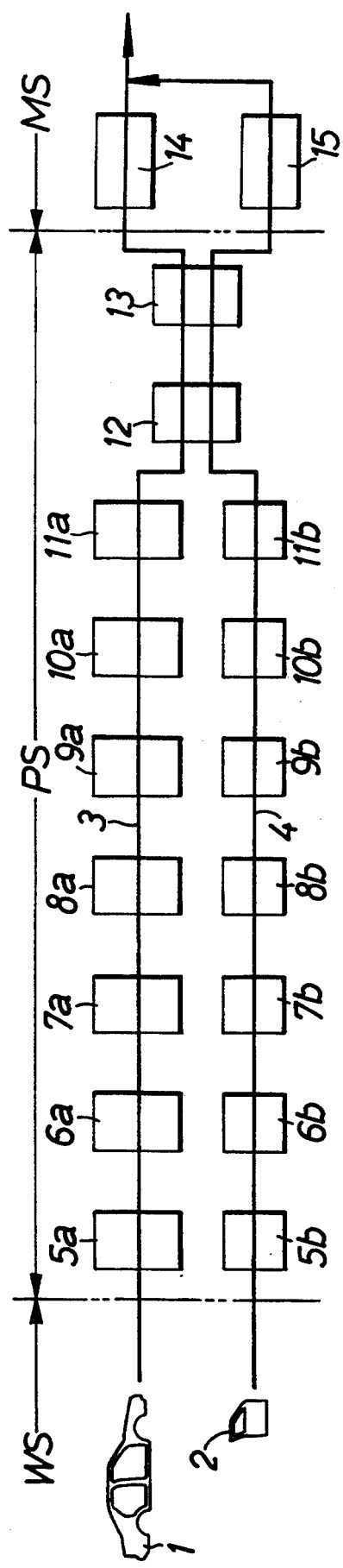

FIG. 14 illustrates a second embodiment of the present invention, wherein parts corresponding to those in the first embodiment are indicated by the same reference characters. In this embodiment, what is noticeable is that the vehicle body 1 and the plate-like part 2 are independently treated at sections excluding the topcoating and the final drying at the painting step PS. More specifically, the main line 3 and the sub-line 4 are individually passed through a pretreating booth 5a, 5b, a hydro-extraction drying oven 6a, 6b, a priming booth 7a, 7b, a washing booth 8a, 8b, a drying oven 9a, 9b, a sealer booth 10a, 10b and a drying oven 11a, 11b, respectively.

Figure 15:
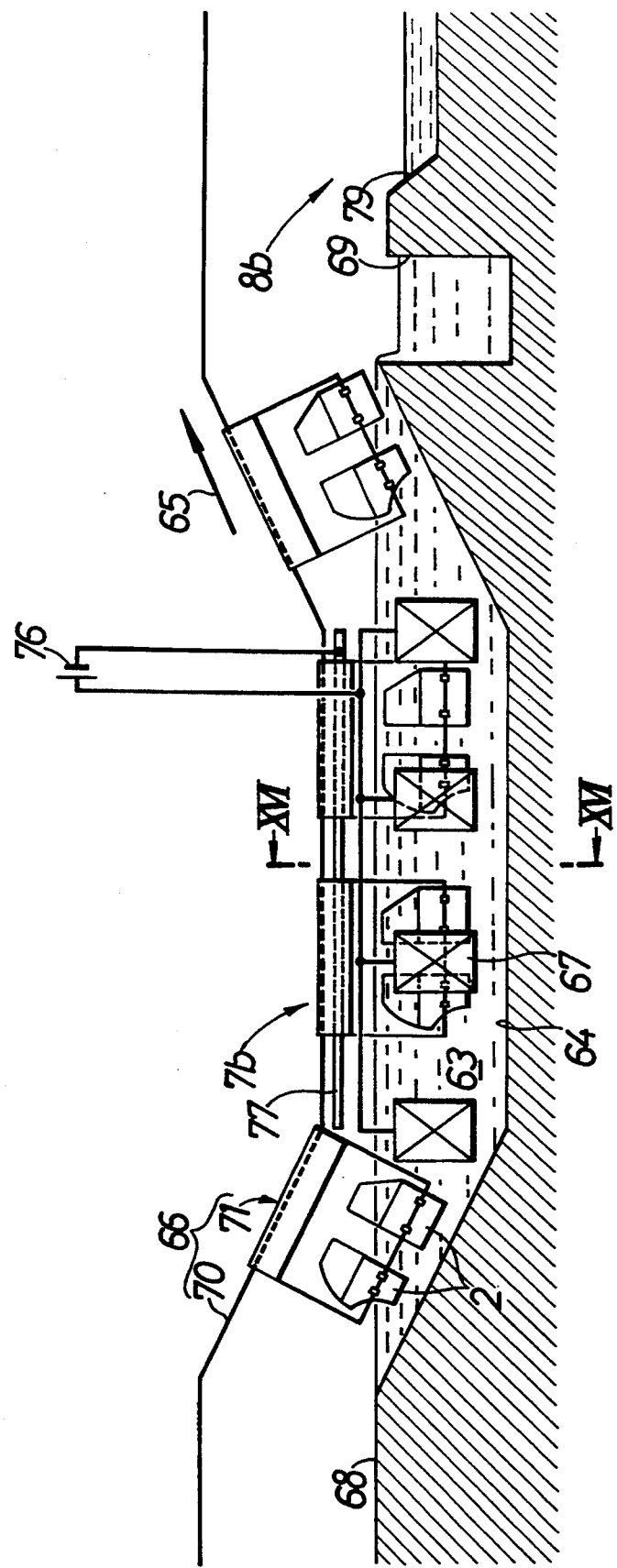
Figure 16:
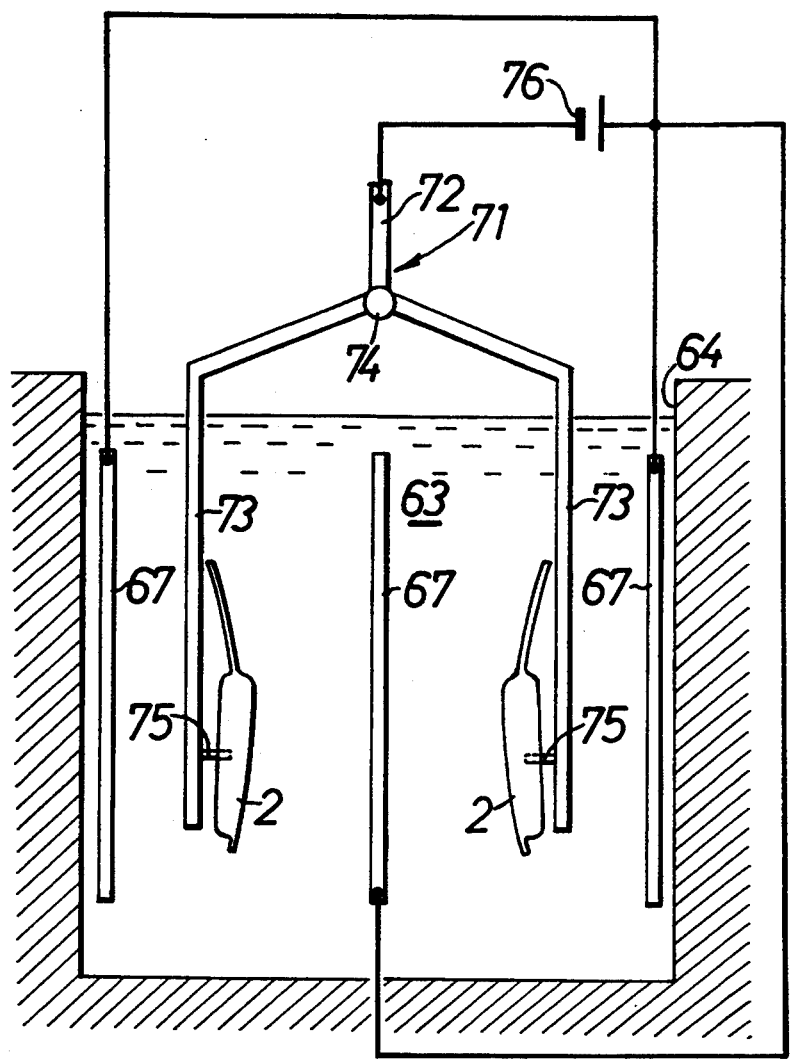
Figure 17:
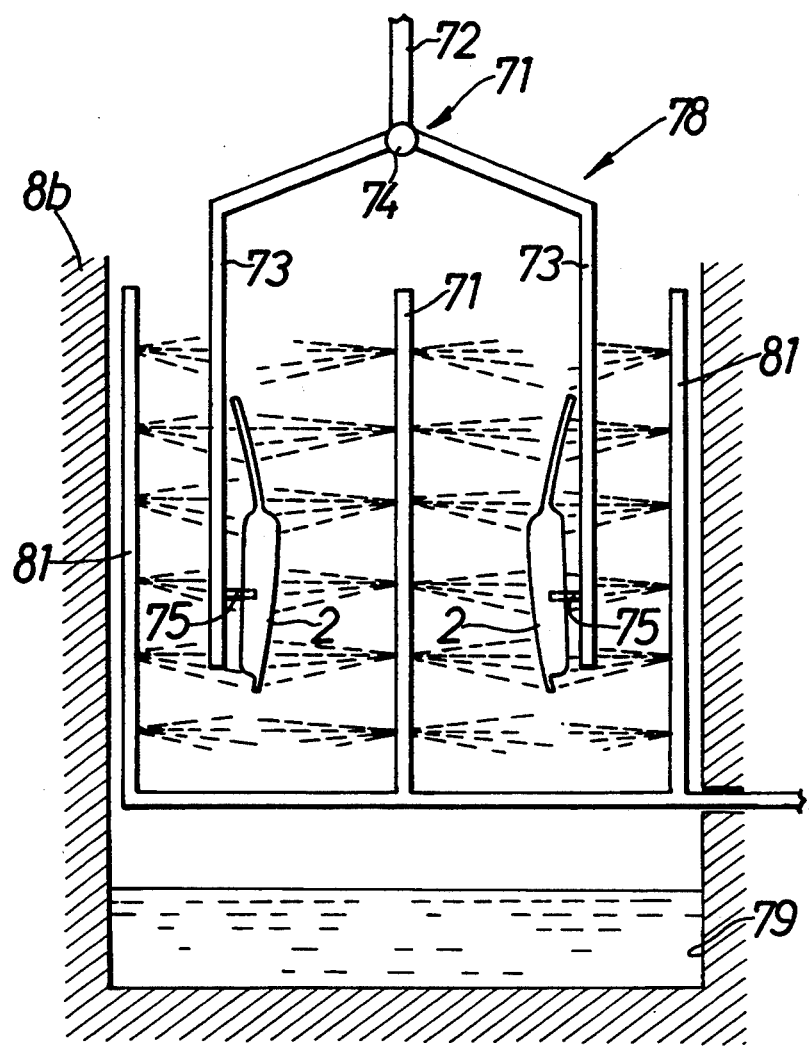
Figure 18:
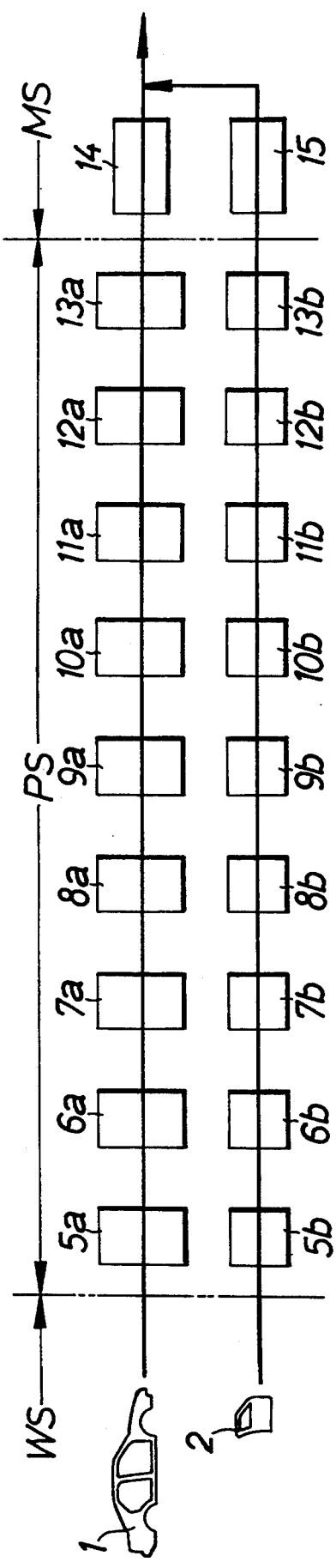
FIG. 18 is a process view of a third embodiment.

Moreover, the transport system 16 described in the above first embodiment is disposed in the topcoating booth 12 and the drying oven 13, and the priming booth 7b and the washing booth 8b are constructed as shown in FIGS. 15 to 17.

A plurality of, e.g., two rows of the plate-like parts 2 are subjected to an electro-deposition coating for a primer corrosion protecting treatment in the priming booth 7b. Disposed in the priming booth 7b are an electro-deposition bath 64 filled with an electro-deposition coating fluid 63, an overhead conveyer 66 for transporting the plate-like parts 2 releasably carried thereon in the transporting direction 28 so that they may be immersed in the electro-deposition coating fluid 63, and a plurality of electrodes 67 fixedly disposed in the electro-deposition bath 64.

The electro-deposition bath 64 is formed by digging-down of a floor surface 68 in the coating line, with bottom surfaces of the electro-deposition bath 64 being inclined at its rear and front ends in the transporting direction 65 to provide the smooth entering and exiting of the plate-like parts 2 into and out of the bath. In addition, an overflow bath 69 is formed by digging-down of the floor surface 68 and connected to a front edge of the electro-deposition bath 64 in the transporting direction 65, so that the level of the electro-deposition coating liquid 63 in the electro-deposition bath 64 is always maintained constant by allowing the electrodeposition coating liquid in the electro-deposition bath 64 to constantly overflow into the overflow bath 69.

The overhead conveyer 66 comprises a rail 70 laid above the floor surface 68 along the transporting direction 65, and a hanger 71 travellable along the rail 70 to releasably support a plurality of the plate-like parts 2. The rail 70 is disposed at a substantially constant distance apart from the floor surface and the bottom surface of the electro-deposition bath 64, and at sections corresponding to the front and rear ends of the electro-deposition bath 64 in the transporting direction 65, the rail 70 is inclined in correspondence to the bottom surfaces of the electro-deposition bath 64. The hanger 71 comprises a travelling portion 72 adapted to travel along the rail 70, and a pair of left and right support portions 73, 73 for releasably supporting the plate-like parts 2, respectively. The both support portions 73, 73 are carried on a lower end of the travelling portion 72 for opening and closing operation through a support shaft 74 extending in parallel to the transporting direction 65. Further, locking portions 75 for releasably supporting the plate-like parts 2 are mounted on the individual support portions 73, 73 at two points spaced apart in the transporting direction 65, respectively, so that the hanger 71 is capable of supporting and transporting the plate-like parts 2 arranged laterally side-by-side in pairs at two front and rear places.

The three electrodes 67 are fixedly disposed within the electro-deposition bath 64 at each of a plurality of, e.g., four places as shown in FIG. 15, spaced apart in the transporting direction 65. Specifically, the electrodes 67 are fixedly disposed respectively at the opposite sides and the widthwise central portions of the electro-deposition bath 64, so that they may be opposed to each other on the opposite sides of the plate-like parts 2 being transported laterally side-by-side by the overhead conveyer 66, and each electrode 67 is connected to a plus terminal of a power supply 76. On the other hand, an electrical feed rail 77 connected to a minus terminal of the power supply 76 is laid above the electro-deposition bath 64 in parallel to the rail 70, and the hanger 71 which has come above the electro-deposition bath 64 is electrically connected to the feed rail 77. This results in that each plate-like part 2 carried by the hanger 71 will be connected to the minus terminal of the power supply 76 within the electro-deposition bath 64.

Here, it is noted that a washer 78 such as shown in FIG. 17 is disposed to clean off an excess portion of the coating deposited on each plate-like part 2 after electro-deposition coating by immersion into the electro-deposition coating liquid 63 in the electro-deposition bath 64.

The washer 78 comprises washing liquid pipings 81 disposed in the washing booth 8b having an upward opened washing liquid reservoir 79 disposed at its bottom to eject a washing liquid toward the opposite surfaces of the plate-like part 2 supported by the hanger 71. Specifically, the washing pipings 81 are fixedly disposed at three places: opposite sides and widthwise central portion within the washing booth 8b. A plurality of ejection holes are made in the washing liquid pipings disposed on the opposite sides within the washing booth 8b to eject the washing liquid onto the plate-like parts 2 supported in two rows by the hanger 71 from the outside thereof, and a plurality of ejection holes are made in the central washing liquid piping 81 to eject the washing liquid onto the plate-like parts 2 carried by the hanger 71 from the inside thereof. Further, the individual washing liquid pipings 81 are connected to a common washing liquid feed source which is not shown.

With this second embodiment, treatments suitable for the shapes of the plate-like parts 2 are possible, in addition to the effects in the previous first embodiment, and particularly, the preteatment can be completely carried out into details. Further, it is possible to provide an energy conservation at the painting step for the plate-like parts 2 because of a relatively small size of the plate-like part 2. Moreover, in the priming booth 7b, a plurality of, e.g., a pair of plate-like parts 2 are simultaneously subjected to the immersion treatment in an arranged relation to provide an increase in throughput and yet, disposition of the electrodes 67 in an opposed relation on the opposite sides of each plate-like part 2 ensures that the distances between the opposite surfaces of each plate-like part 2 and the electrodes 67 is substantially equal, and a portion not facing to the electrode 67 is eliminated, thus making it possible to provide an improvement in coating quality. Yet further, even in the washing booth 8b, the washing liquid is ejected toward the opposite surfaces of each plate-like part 2, and this makes it possible to achieve a satisfactory washing effect and to provide a reduction in size of the washing booth.

FIG. 1B illustrates a third embodiment of the present invention, wherein like reference characters designate parts corresponding to those in the above-described embodiments.

In the third embodiment, the vehicle body 1 and the plate-like part 2 are separately treated in the painting step PS. Specifically, the main line 3 and the sub-line 4 are independently passed through the pretreating booth 5a, 5b, the hydro-extraction drying oven 6a, 6b, the priming booth 7a, 7b, the washing booth 8a, 8b, the drying oven 9a, 9b, the sealer booth 10a, 10b, the drying oven 11a, 11b, the topcoating booth 12a, 12b and the drying oven 13a, 13b, respectively.

Moreover, the transporting system 16 illustrated in FIGS. 1 to 14 in the first embodiment is disposed in the topcoating booth 12b and the drying oven 13b, and the priming booth 7a and the washing booth 8b are constructed as shown in FIGS. 15 to 17.

In this third embodiment, the painting step PS is carried out independently for the vehicle body 1 and the plate-like parts 2 and hence, it is possible to accomplish the preteatment for coating suitable for the shapes of the plate-like parts 2 as in the previous second embodiment while providing an energy conservation.

What is claimed is:

1. A process for manufacturing a vehicle body having a body portion and a plurality of plate-like parts including a bonnet, doors, and trunk lid to be mounted thereon, wherein each of said plate-like parts may require additional fitting-out for assembly of part thereto, comprising the steps of;
   (a) fabricating said body portion and said plate-like parts separately;
   (b) prior to any assembly step, painting and coating said fabricated body portion and said fabricated plate-like part separately to their final finish by conveying said fabricated body portion and said fabricated plate-like parts individually through identical painting and coating stages, wherein said conveying of said plate-like parts includes transporting said plate-like parts between stages with the plate-like parts vertically aligned with one another while holding said plate-like parts in a horizontal position, and at each stage rotating at least some of the plate-like parts around a vertical axis relative to each other, thereby bring said at least some of said plate-like parts to a position out of vertical alignment, and then subjecting an upwardly facing surface of each of said at least some of the plate-like parts to a painting and coating operation from above;

(c) fitting out said coated body portion and said coated plate-like parts separately by assembling parts thereto; and (d) after the fitting-out step, assembling the plate-like parts to the body portion.

2. The process for manufacturing a vehicle body as recited in claim 1, wherein said conveying further includes rotating said at least some of the plate-like parts, after subjecting said upward facing surface of said at least some of said plate-like parts to said painting and coating operation from above at one of the painting and coating stages, around the vertical axis relative to each other until aligning said at least some of said plate-like parts again vertically with one another and, at a following one of the painting and coating stages, rotating one of said plate-like parts other than said at least some plate-like parts around the vertical axis relative to each other, thereby bringing said other ones of said plate-like parts to positions out of vertical alignment with each other and then subjecting an upwardly facing surface of each of said other ones of said plate-like parts to a painting and coating operation from above.

3. The process for manufacturing a vehicle body as recited in claim 1 or 2, wherein said painting and coating includes a topcoating operation and a drying operation following said topcoating operation, the process further comprising vertically aligning said at least some of said plate-like parts with respect to one another while performing said drying operation.

4. The process for manufacturing a vehicle body as recited in claim 1 or 2, wherein said painting and coating includes a topcoating operation and a drying operation following said topcoating operation, the process further comprising, in performing said drying operation, the step of moving each of said at least some of said plate-like parts to a position at which an outer surface of each of said at least some of said plate-like parts is disposed opposite to a side facing a dryer means.

5. A process for manufacturing a vehicle body having a body portion and a plurality of plate-like parts including a bonnet, doors and trunk lid to be mounted thereon, wherein each of said plate-like parts may require additional fitting-out for assembly of parts thereto, comprising the steps of:

(a) fabricating said body portion and said plate-like parts separately;

(b) prior to any assembly step, painting and coating said fabricated body portion and said fabricated plate-like parts separately to their final finish by conveying them individually through identical painting and coating stages;

(c) separately fitting out said coated body portion and said coated plate-like parts by assembling said parts thereto; and (d) after the fitting-out step, assembling the plate-like parts to the body portion without further painting or coating;

wherein said conveying of said plate-like parts includes pivoting some of said plate-like parts about a vertical axis relative to each other so that each of said some of said plate-like parts is not vertically aligned with any other of said some of said plate-like parts, and said painting and coating includes, spraying said each of said some of said plate-like parts, in a not vertically aligned state, from above with a coating onto one of the opposite surfaces thereof and thereafter turning each of said some of said plate-like part 180° about respective horizontal axes and spraying said each of said some of said plate-like parts from above with a coating onto the other of said opposite surfaces.

6. The process for manufacturing a vehicle body as recited in claim 5, wherein said painting and coating stages are spaced from each other in the transporting direction of said plate-like parts, and wherein said painting and coating includes disposing said plate-like parts at different locations with respect to each other along said transporting direction on respective horizontal planes while avoiding vertical alignment of one plate-like part with another plate-like part, and said conveying of said plate-like parts includes moving said plate-like parts so that said some of said plate-like parts are vertically aligned with other of said plate-like parts during movement between one and another of said painting an coating stages.

7. The process for manufacturing a vehicle body as recited in claim 1, 2 or 5, wherein said painting and coating includes a priming operation performed after arranging said plate-like parts in a plurality of rows, and said conveying includes transporting said plate-like parts in said plurality of rows through an electro-deposition bath and said painting and coating further includes effecting an electro-deposition coating in said bath on opposite surfaces of each said plate-like parts with electrodes disposed on opposite sides of each said plate-like parts.

8. A process for manufacturing a vehicle body having a body portion and a plurality of plate-like parts including a bonnet, doors and trunk lid to be mounted thereon, wherein each of said plate-like parts may require additional fitting-out for assembly of parts thereto, comprising the steps of:

(a) fabricating said body portion and said plate-like parts separately;

(b) prior to any assembly step, separately and independently painting and coating said fabricated body portion and said fabricated plate-like parts by holding at least some of the plate-like parts in a horizontal position and in a vertically aligned relation with one another, transporting said body portion and said plate-like parts separately through a plurality of independent painting and coating stages, and rotating said at least some vertically aligned plate-like parts relative to each other around a vertical axis at one of said painting and coating stages and bringing said vertically aligned plate-like parts to positions out of vertical alignment with each other and with the remainder of said plate-like parts and with a surface of each of said at least some of the plate-like parts facing upwardly, at said positions out of vertical alignment with each other, selectively spraying said upwardly facing surface of said each of said at least some of said plate-like parts and said body portion with a coating from above while transporting said plate-like parts and said body portion, thereby providing coated plate-like parts and a coated body portion;

(c) performing independent topcoating and final drying operations on said coated body portion and said coated plate-like parts by transporting said coated body portion and said coated plate-like parts through topcoating and final drying stages;

(d) fitting out said coated and dried body portion and said coated and dried plate-like parts separately by assembling said parts thereto; and (e) after said fitting out, assembling said plate-like parts to said body portion.

9. The process for manufacturing a vehicle body as recited in claim 8, further comprising the step of vertically overlying said at least some of the plate-like parts with respect to one another during said final drying operation.

10. The process for manufacturing a vehicle body as recited in claim 8, further comprising, in said drying operation, the step of moving each of said at least some of the plate-like parts to a position at which an outer surface of each plate-like part is disposed on a side opposite to a side facing a dryer means.

11. A process for manufacturing a vehicle body having a body portion and a plurality of plate-like parts said plate-like parts including a bonnet, doors and trunk lid to be mounted thereon, where(d) in each of said plate-like parts may require additional fitting-out for assembly of parts thereto, comprising the steps of:

(a) separately fabricating said body portion and said plate-like parts;

(b) separately and independently painting and coating said fabricated body portion and said fabricated plate-like parts by transporting separately said fabricated body portion and said fabricated plate-like parts through a plurality of independent painting and coating stages;

(c) performing independent topcoating and final drying operations on said painted and coated body portion and said painted and coated plate-like parts by transporting said painted and coated body portion and said painted and coated plate-like parts through topcoating and final drying stages;

(d) separately fitting out said topcoated and dried body portion and said topcoated and dried plate-like parts by assembling parts thereto; and (e) after said fitting-out assembling said plate-like parts to said body portion without further painting or coating;

wherein said painting and coating includes transporting said body portion and said plate-like parts in a direction through said painting and coating stages, excluding said final drying operation, while holding said plate-like parts substantially in a horizontal attitude, with vertical spacings provided therebetween, but with some of said plate-like parts out of vertically aligned relation with each other by pivoting each said plate-like parts about a vertical axis, spraying each of said some of said plate-like parts out of vertical alignment from above with a coating onto one of opposite surfaces thereof and thereafter turning said each of said sprayed plate-like parts 180° about respective horizontal axes and spraying each said turned plate-like parts from above with a coating onto the other of said opposite surfaces thereof.

12. The process for manufacturing a vehicle body as recited in claim 11, wherein said painting and coating stages are spaced from each other in the transporting direction of said fabricated body portion and said fabricated plate-like parts, and wherein said painting and coating includes disposing said plate-like parts on horizontal planes at different locations with respect to each other, thereby avoiding vertical alignment of plate-like parts with one another at each said painting and coating stage and moving at least some of said plate-like parts so that said moved plate-like parts are vertically aligned with other plate-like parts while being transported between one and another of said painting and coating stages.

13. The process for manufacturing a vehicle body as recited in claim 8 or 11 wherein said painting and coating includes a priming operation for coating said plate-like parts, said priming operation being performed by arranging said plate-like parts in a plurality of rows and, while transporting said plate-like parts through an electro-deposition bath, effecting an electro-deposition coating to opposite surfaces of each plate-like part with electrodes disposed on opposite sides of said plate-like parts.

14. A process for manufacturing a vehicle body having a body portion and a plurality of plate-like parts including a bonnet, doors, and trunk lid to be mounted thereon, wherein each of said plate-like parts may require additional fitting-out for assembly of parts thereto before mounting on said body portion, comprising the steps of:

(a) fabricating said body portion and said plate-like parts separately;

(b) prior to any assembly step, separately painting and coating said fabricated body portion and said fabricated plate-like parts from above by holding at least some of the plate-like parts in a horizontal position and in a vertically aligned relation with each other, transporting said body portion and said plate-like parts separately through a plurality of independent painting and coating stages excluding a topcoating stage and a final drying stage and at said painting and coating stages, during said transporting, rotating said at least some of the plate-like parts around a vertical axis relative to each other, thereby alternately bringing said rotated plate-like parts to a position out of vertical alignment and conducting said painting and coating selectively to an upwardly facing surface of each of said at least some of the plate-like parts out of said vertical alignment from above said plate-like parts out of vertical alignment, thereby providing coated plate-like parts and a coated body portion;

(c) performing identical topcoating and final drying operations on said coated body portion and said coated plate-like parts by transporting them through said topcoating and final drying stages;

(d) then fitting out said coated body portion and said coated plate-like parts separately by assembling said parts thereto; and (e) after the fitting-out step, assembling the plate-like parts to the body portion.

15. The process for manufacturing a vehicle body, as recited in claim 14, further comprising the step of aligning said at least some of the plate-like parts with respect to one another vertically while performing said final drying operation.

16. The process for manufacturing a vehicle body as recited in claim 14, further comprising, in performing said drying operation, the step of moving each of said at least some of each plate-like part to a position at which an outer surface of said plate-like part is disposed on a side opposite to a side facing a dryer means.

* * * * *